Nov. 30, 1937.  A. J. TROTT  2,100,457
VALVE
Filed Dec. 27, 1933
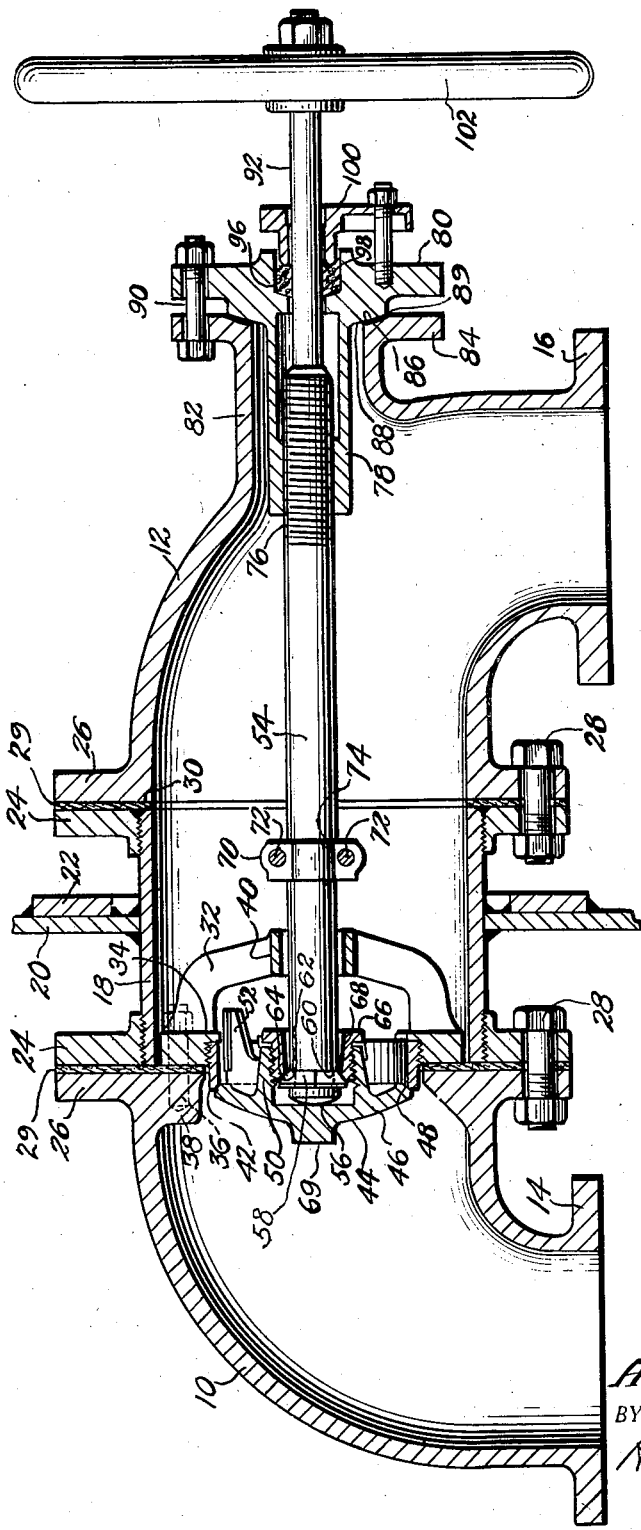
INVENTOR.
Arthur J. Trott
BY
Albert J. Henderson
ATTORNEY.

Patented Nov. 30, 1937

2,100,457

UNITED STATES PATENT OFFICE 2,100,457

VALVE

Arthur J. Trott, Greensburg, Pa., assignor to Walworth Patents Inc., Boston, Mass., a corporation of Massachusetts Application December 27, 1933, Serial No. 704,148

9 Claims. (Cl. 137—21)

This invention relates to valves and more particularly, to draw-off valves for liquid storage tanks and the like.

One object of the invention is to protect the valve and its operating mechanism from freezing and other damage.

Another object of the invention is to render the valve and its seat easily removable and replaceable in the housing, thus facilitating assembly and grinding of the seating surfaces.

Another object of the invention is to compensate for misalignment of the parts so that twisting or bending of the stem will be avoided.

Another object of the invention is to provide for self-adjustment of the valve member on its seat.

Another object of the invention is to insure tightness of the parts by adjustment means.

Another object of the invention is to limit the movements of the valve by positive means.

Other objects and advantages will become apparent from the following description taken in connection with the accompanying drawing which shows a longitudinal section through a draw-off valve constructed in accordance with this invention.

Referring more particularly to the drawing, it will be seen that the housing for the valve includes an elbow member 10 forming an inlet to the valve and a similar elbow 12 forming an outlet therefor. The elbow 10 is provided with a flange 14 for connection to a suitable drain pipe not shown and the elbow 12 is provided with a similar flange 16 for connection to a service pipe or the like not shown.

The elbows 10 and 12 are connected by a sleeve 18 which is welded intermediate its ends to a tank wall 20. This construction enables the valve proper to be housed within the storage tank where the danger of freezing or other damage is remote. An annular plate 22 may be welded to the tank wall 20 around the sleeve 18 in order to reinforce the tank wall at this point.

While it will be apparent that any suitable means may be employed for connecting the sleeve 18 to the elbows 10 and 12, this is preferably accomplished providing a flange 24 threadedly engaging the sleeve 18 at each end thereof and connected by means of the bolts 28 to the flanges 26 formed on the adjacent ends of the elbows 10 and 12.

A gasket 29 may be provided between the inlet elbow flange 26 and the flange 24 and similarly between the outlet elbow flange 26 and the flange 24 to provide a seal at these points.

The valve proper comprises a body in the form of a spider 32 having an integral annular flange 34 which is adapted to be secured to the elbow 10 interior of the sleeve 18 by means of studs 36 which project from suitable bosses 38 formed on the inner surface of the elbow 10. It will be understood that the spider 32 may have any desired number of legs, the preferred number being three, of which only two are shown in the drawing. The legs of the spider 32 extend from the flange 34 to an integral hub portion 40 for purpose to be described later.

Projecting from the flange 34 and threadedly secured thereto is a seat ring 42 upon which a valve member 44 is adapted to seat. The valve member in this instance comprises a head 46 having a peripheral seating surface 48 and an internally threaded hollow boss 50 projecting from the central portion thereof. The valve member 44 may be guided to its seat by means of fingers 52 formed integrally with the head 46 and the boss 50. Preferably, three such fingers are used only one of which is shown in the drawing.

Suitable means are provided to move the valve member to and from its seat. In this instance this means comprises an operating stem 54 extending through the housing and the hub 40 and terminating in a rounded end 56 adapted to extend into the hollow boss 50 and engage the valve head 46. The operating stem 54 is preferably connected to the head 46 by means of a collar 58 which is formed in two halves and inserted in a suitable recess 60 formed in the operating stem 54 adjacent the rounded end 56. The outer edge 62 of the collar 58 is made of spherical form and engages a spherical or optionally conical seat 64 formed on a nut 66 which threadedly engages the boss 50 and thus serves to retain the stem 54 in position.

The nut 66 is provided with a tapered bore 68 which is sufficiently large to permit lateral movement of the stem for a purpose to be described hereinafter. To facilitate assembly of the nut 66 on the head 46 a projection 69 of polygonal form may be provided on the head for engagement by a wrench or similar tool.

In accordance with this invention means are provided to positively limit the movements of the valve member and, to this end, abutment means are provided on the operating stem which are adapted to engage the hub 40 of the spider 32. The abutment means may be of any suitable form and in this instance, comprises a collar 70 formed in two halves and secured by means of the bolts 72 in a recess 74 formed in the operating stem. It will be understood that the recess 74 is spaced a sufficient distance from the collar 40 to permit full opening of the valve when the stem 54 is operated.

In order to move the valve member to and from its seat the stem 54 is threaded as at 76 for engagement with a threaded sleeve 78 projecting from a stuffing box 80. The sleeve 78 is housed within, but spaced from, an annular projection 82 opening from the side wall of the outlet 12 and terminating in a flanged end 84. The flanged end 84 is provided with a spherical or optionally conical seat 86 which may be engaged by a spherical seat 88 formed upon the stuffing box 80. Preferably, however, a gasket 89 is interposed between these seats. Bolts 90 may be employed to secure the flange 80 of the stuffing box to the flange 84 of the outlet 12 and thus a seal is provided for the opening in the latter element.

The stem 54 is reduced as at 92 beyond the threaded portion 76 and is engaged by an inwardly projecting flange portion 94 on the stuffing box. The stuffing box may be provided with a bore 96 beyond the flange 94 for the reception of packing 98 and the usual packing gland 100. A suitable handwheel 102 may be secured to the stem beyond the gland 100 in order to effect rotation of the stem.

From the foregoing description it will be seen that means have been provided to compensate for any inaccuracies in manufacture such as would lead to misalignment of the parts and consequently twisting or bending of the stem when assembled. The spherical seats provided on the stuffing box 80 and the stem collar 58 which engage the corresponding spherical seats on the outlet 12 and retaining nut 66 respectively form ball and socket connections therewith which have certain advantages and novel characteristics as will now be pointed out.

When it is considered that the operating stem varies from three to five feet in length according to the size of valve, it will be appreciated that a slight tilting of the valve head due to an inaccurately fitted seat ring would be greatly exaggerated at the other end of the stem if the valve head and stem were rigidly secured together. Upon assembly in such a case the stem would be bent when the stuffing box bolts were tightened rendering operation difficult and leading to leakage at the seat.

With the ball and socket connections at each end of the stem as described herein, the stem can be positioned at an angle to the valve head if necessary and secured in such position without tendency to bend itself into perpendicular relationship. This misalignment of the stem is permitted by the tapered bore 68 on the head nut 66 and the clearance between the stem and the hub bore 40. The latter element provides a guide and support for the stem when being assembled and support for the stem when being assembled in the housing but does not interfere with the described angular positioning of the stem.

Moreover, the ball and socket connection between the valve head and stem permits the valve head to adjust itself to its seat when moved into engagement therewith. This is facilitated by the rounded end 56 on the stem which engages the valve head and forms an additional advantage over a rigid connection between these members.

Should it be desired to renew or regrind the valve seat or the valve member it is merely necessary to remove the handwheel 102 and the bolts 28 of the outlet 12 whereupon the outlet 12 can be rotated upon the threaded stem 76 and thus withdrawn to enable the operator to remove the spider from the studs 36. To prevent rotation of the adjacent flange 24 on the sleeve 18 when the outlet 12 is rotated these members may be welded as at 30.

It will thus be seen that novel means have been employed to accomplish all the objects of the invention. The valve is simple in construction and operation and accessible for cleaning or regrinding of the parts. Moreover, there is no danger of freezing or other injury to the valve member and its seat. Furthermore, the valve operating mechanism and particularly the threaded part thereof is also protected from damage by being within the outlet.

I claim:

1. A valve assembly for storage tanks and the like, comprising in combination, a housing secured intermediate its ends to a tank wall and projecting into said tank, said housing having an outlet exterior of said tank, a valve body secured to the housing within the tank, a valve member movable into and out of engagement with said body, a rotatable operating stem extending from said valve member through an opening in a side wall of the housing exterior of said tank, a stuffing box member surrounding the stem and secured to the housing in sealed engagement with the said opening, packing in said stuffing box engaging said stem, a sleeve projecting from the stuffing box member into the housing but being exterior of said tank, and interengaging threaded portions on the sleeve and stem located wholly within the housing beyond said packing.

2. A valve assembly for storage tanks and the like, comprising in combination, a housing secured intermediate its ends to a tank wall and projecting into said tank, said housing having an outlet exterior of said tank, a valve body secured to the housing within the tank, a valve member movable into and out of engagement with said body, a rotatable operating stem for said valve member extending through an opening in a side wall of the housing exterior of said tank, a ball and socket connection between the stem and the valve member, a stuffing box for the stem, means on said stuffing box having a ball and socket connection with said housing, and a sleeve enclosed by the housing exterior of said tank projecting from said stuffing box and threadedly engaging said stem.

3. A valve assembly for storage tanks and the like, comprising in combination, a housing secured intermediate its ends to a tank wall and projecting into said tank, a valve body secured to the housing within the tank, a valve member movable into and out of engagement with said body, a rotatable operating stem for said valve member extending through an opening in a side wall of the housing exterior of said tank, means extending from said valve body forming a guide and support for said stem at one end thereof, a ball and socket connection between said stem and the valve member, a stuffing box for the stem, means on said stuffing box having a ball and socket connection with said housing, a sleeve enclosed by the housing projecting from said stuffing box and threadedly engaging said stem, and an abutment on the stem movable therewith into engagement with said guide support to limit longitudinal movement of said stem.

4. A valve assembly for storage tanks and the like, comprising in combination, a housing secured intermediate its ends to a tank wall and projecting into said tank, a valve body secured to the housing within the tank, a separable seat secured to the valve body, a valve member movable into and out of engagement with said seat, a plurality of guide elements on said valve member to position it relatively to said seat, a rotatable operating stem for said valve member extending through an opening in a side wall of the housing exterior of the tank, a spider extending from said valve body and forming a guide and support for said stem at one end thereof, a collar on said stem having a spherical seat, means engaging an extending portion of said valve member and said collar and forming a ball and socket connection therewith, a stuffing box at the other end of the stem from said valve member, a flange on said stuffing box having a spherical seat, means on said housing adjacent said opening adapted to be engaged by said flange and forming a ball and socket connection therewith, a sleeve enclosed by the housing projecting from said stuffing box and threadedly engaging said stem, and an abutment on the stem movable therewith into engagement with said guide support to limit longitudinal movement of said stem.

5. A valve assembly for liquid storage tanks comprising in combination, a tubular fitting secured to the tank wall and projecting therewithin, an elbow body secured to the fitting and located wholly exterior of the tank, said fitting and elbow together forming a continuous passageway from the interior to the exterior of the tank through said wall, a second elbow member secured to the fitting and located wholly within the tank, a spider carried by said second elbow adjacent its connection with said fitting, an annular valve seat carried by said spider and projecting into the passageway, a valve stem extending longitudinally through the first said elbow from the exterior thereof and through the spider and terminating at its inner end opposite the valve seat, a valve member secured to the inner end of the stem and movable therewith into engagement with the valve seat for closing the passageway, and a pipe connection on the second elbow beyond the valve seat whereby liquid may be conveyed from the tank up to the valve seat for discharge through said passageway when the valve member is disengaged from said seat.

6. A valve assembly for liquid storage tanks comprising in combination, a tubular fitting secured to the tank wall and projecting therewithin, an elbow body detachably secured to the fitting independently of the tank and located wholly exterior of said tank, said fitting and elbow together forming a continuous passageway from the interior to the exterior of the tank through said wall, an introverted flange associated with the end of the tubular fitting within the tank, an annular valve seat secured to said flange substantially concentric with said tubular fitting, a valve stem extending longitudinally through said elbow from the exterior thereof and terminating at its inner end opposite the valve seat, a valve member carried by the inner end of the stem and movable therewith into and out of engagement with said valve seat for closing and opening the passageway, and a pipe connection on the tubular fitting beyond the flange whereby liquid may be conveyed from the tank up to the valve seat for discharge through said passageway when the valve member is disengaged from said seat.

7. A valve assembly for liquid storage tanks comprising in combination, a tubular fitting secured in an opening in the tank wall and having portions projecting within and without said tank, flanges carried by said fitting at either end thereof and spaced from the tank wall, an elbow body having a flange detachably secured to the flange on said fitting exterior of said tank, a second elbow having a flange secured to the flange on said fitting interior of said tank, a projection on the inner surface of the side wall of the first said elbow having an opening therein, an annular valve seat on the second said elbow projecting into the passageway and aligned with the opening in said projection, a valve stem extending through said opening from the exterior of the first said elbow to the said valve seat, a valve member carried by the valve stem and movable therewith into and out of engagement with the valve seat, and means for supporting and guiding the valve stem positioned intermediate the valve member and the opening.

8. A valve assembly for liquid storage tanks comprising in combination, a tubular fitting secured to the tank wall and projecting therewithin, an elbow body detachably secured to the fitting independently of the tank and located wholly exterior of the tank, said fitting and elbow together forming a continuous passageway from the interior to the exterior of the tank through said wall, an annular valve seat projecting into the passageway at the end within the tank and being adjacent said tank wall, a valve stem extending longitudinally through the elbow from the exterior thereof and terminating at its inner end opposite the valve seat, a valve member secured to the inner end of the stem and movable therewith into and out of engagement with the valve seat for closing and opening the passageway, said elbow body being separable from said fitting to permit removal of the valve member from exterior of the tank, and a pipe connection on the tubular fitting beyond the valve seat whereby liquid may be conveyed from the tank up to the valve seat for discharge through said passageway when the valve member is disengaged from said seat.

9. A valve assembly for liquid storage tanks comprising in combination, a tubular fitting secured to the tank wall and projecting therewithin, an elbow body detachably secured to the fitting and located wholly exterior of the tank, said fitting and elbow together forming a continuous passageway from the interior to the exterior of the tank through said wall, an annular valve seat projecting into the passageway at the end within the tank and being adjacent said tank wall, a valve stem extending longitudinally through an opening in the elbow from the exterior thereof and terminating at its inner end opposite the valve seat, a threaded sleeve closing the opening in the elbow and projecting therewithin into operative engagement with said stem, a stuffing box integral with said sleeve for sealing said stem, a valve member secured to the inner end of the stem and movable therewith into and out of engagement with the valve seat for closing and opening the passageway, and a pipe connection on the tubular fitting beyond the valve seat whereby liquid may be conveyed from the tank up to the valve seat for discharge through said passageway when the valve member is disengaged from said seat.

ARTHUR J. TROTT.